United States Patent
Sanzone et al.

(10) Patent No.: US 11,229,867 B2
(45) Date of Patent: Jan. 25, 2022

(54) AIR FILTER ASSEMBLY

(71) Applicant: Ford Global Technologies, LLC, Dearborn, MI (US)

(72) Inventors: Tara Sanzone, Gustavo A. Madero (MX); Jose Quezada, Tlalnepantla (MX)

(73) Assignee: Ford Global Technologies, LLC, Dearborn, MI (US)

( * ) Notice: Subject to any disclaimer, the term of this patent is extended or adjusted under 35 U.S.C. 154(b) by 306 days.

(21) Appl. No.: 16/439,618

(22) Filed: Jun. 12, 2019

(65) Prior Publication Data
US 2020/0391149 A1 Dec. 17, 2020

(51) Int. Cl.
*B01D 46/00* (2006.01)
*F02M 35/02* (2006.01)
*F02M 35/024* (2006.01)

(52) U.S. Cl.
CPC ..... *B01D 46/0005* (2013.01); *F02M 35/0204* (2013.01); *F02M 35/024* (2013.01); *B01D 2265/029* (2013.01); *B01D 2279/60* (2013.01)

(58) Field of Classification Search
CPC .. B01D 46/0005; B01D 46/42; B01D 50/002; B01D 2265/029; B01D 2279/60; F02M 35/0203; F02M 35/161; F02M 35/024; F02M 35/0204; F02D 9/02; F16D 13/16; F16M 13/00
USPC ..................... 55/385.3, 481; 95/273; 180/219
See application file for complete search history.

(56) References Cited

U.S. PATENT DOCUMENTS

| 5,026,235 A | 6/1991 | Muller et al. | |
| 8,052,780 B2 * | 11/2011 | Rotter | B01D 50/002 95/273 |
| 9,752,542 B1 | 9/2017 | Mackenzie et al. | |
| 2002/0017084 A1 * | 2/2002 | Willig | F02M 35/161 55/385.3 |
| 2005/0229561 A1 * | 10/2005 | Nepsund | B01D 46/42 55/481 |
| 2010/0025179 A1 * | 2/2010 | Behrens | F16M 5/00 192/76 |
| 2014/0131128 A1 * | 5/2014 | Schuhmacher | B60K 13/04 180/219 |

(Continued)

FOREIGN PATENT DOCUMENTS

| JP | 2006281806 A | 10/2006 |
| JP | 4697641 B2 | 6/2011 |

(Continued)

OTHER PUBLICATIONS

Brewer, K. et al., "Isolating Fastener," U.S. Appl. No. 16/380,633, filed Apr. 10, 2019, 48 pages.

*Primary Examiner* — Minh Chau T Pham
(74) *Attorney, Agent, or Firm* — Geooffrey Brumbaugh; McCoy Russell LLP

(57) ABSTRACT

An air filter assembly is provided. The air filter assembly includes a housing enclosing a filter unit, an attachment bracket integrated into the housing and including a slot, and an attachment apparatus clamping the attachment bracket to an engine compartment component. The attachment apparatus includes a screw that includes a threaded shaft extending from a head, a grommet mating with the slot, a nut threadingly engaged with the threaded shaft, and a compression limiter positioned between the nut and the head.

20 Claims, 7 Drawing Sheets

(56) References Cited

U.S. PATENT DOCUMENTS

| | | | | |
|---|---|---|---|---|
| 2019/0128193 A1* | 5/2019 | Yamaguchi | ............... | F02D 9/02 |
| 2020/0095961 A1* | 3/2020 | Morton | .............. | B01D 46/0005 |
| 2020/0095962 A1* | 3/2020 | Morton | .............. | F02M 35/0203 |

FOREIGN PATENT DOCUMENTS

| | | | |
|---|---|---|---|
| JP | 5648421 | B2 | 1/2015 |
| WO | 0073605 | A1 | 12/2000 |

* cited by examiner

AIR FILTER ASSEMBLY

FIELD

The present description relates to an air filter assembly in an engine intake system.

BACKGROUND/SUMMARY

Engine airbox design goals may include decreasing noise vibration and harshness (NVH), decreasing pressure drop across the filter, and increasing particulate holding capacity. Filter and housing volumes are airbox characteristics affecting all of the aforementioned design goals. Vehicles are also commonly designed with increased engine compartment compactness in mind. The desire to increase airbox volume may however be at odds with increasing engine compartment compactness. For instance, in space constrained engine compartments, airbox attachment features have previously necessitated the size of the filter and housing to be reduced. Consequently, the pressure drop across the airbox is increased and the particulate holding capacity of the airbox is reduced. Thus, a desirable airbox volume has previously been unachievable in compact engine compartments due to the bulky and inefficient attachment mechanisms used to attach the airbox to external engine components.

One example approach for balancing engine compartment compactness with airbox design goals is shown by Rotter et al. in U.S. Pat. No. 8,052,780. In Rotter, the air cleaner assembly includes a filter unit within a housing, and includes bosses, flanges, etc., on the housing to enable attachment of the assembly to external components. However, the inventors have recognized several drawbacks with Rotter's air cleaner. For instance, the mounting structure in the air cleaner assembly increases the profile of the assembly and requires large tooling clearances to install. Consequently, the air cleaner assembly may not only be difficult to install in a space constrained engine compartment but may also need to be downsized to meet packaging goals in certain vehicles. Downsizing the air cleaner increases the device's pressure drop and decreases the device's particulate holding capacity.

To resolve at least a portion of the abovementioned problems, an air filter assembly is provided that comprises a housing enclosing a filter unit, an attachment bracket, including a slot, integrated into the housing, and an attachment apparatus clamping the attachment bracket to an engine compartment component. The attachment apparatus comprises a screw including a threaded shaft extending from a head, a grommet mating with the slot, a nut threadingly engaged with the threaded shaft, and a compression limiter positioned between the nut and the head. The attachment bracket slot in conjunction with the attachment apparatus grommet allows the assembly to be efficiently installed. For instance, the attachment apparatus may be attached as a single unit to the attachment bracket slot with limited tooling operations, if desired. In such an example, the attachment apparatus may be first bolted to the engine compartment. After bolting the attachment apparatus to the engine compartment, the air cleaner attachment bracket slot may be slid into the attachment apparatus. Using this attachment method avoids the use of specific tools, if desired. The attachment bracket therefore does not need tooling clearance in order to install the air cleaner assembly in the engine compartment. Consequently, the air cleaner assembly may be made easier and more efficient by reducing tooling time, enabling manufacturing costs of the vehicle to be reduced.

In one example, the attachment bracket may include opposing side walls, an end wall, and a slot spaced away from the end wall. The slot allows the attachment apparatus to be slid into the attachment bracket as a single unit without the use of tools, if desired. For example, during installation, flanges in the grommet may be slid along the opposing side walls toward the end wall of the bracket. As a result, installation efficiency of the air filter assembly is increased.

In a further example, the compression limiter may be designed to inhibit the attachment apparatus from exceeding a threshold clamping force. The compression limiter may include a flange interposed between the head of the screw and the grommet and a body extending from the flange through an interior opening in the grommet. In this way, the likelihood of the attachment apparatus exceeding a threshold clamping force that may damage the bracket and/or the engine compartment component, may be reduced (e.g., eliminated). As a result, the installation process is made more robust.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIGS. 2-11 are shown approximately to scale. However, other relative dimensions may be used, in other embodiments.

DETAILED DESCRIPTION

The following description relates to an air filter assembly designed for efficient installation in a space constrained engine compartment. Air filter assembly characteristics such as pressure drop and particulate holding capacity may not be significantly compromised when designing the profile of the assembly, if desired. Thus, the air filter assembly may not need to be significantly downsized to accommodate for the profile of exterior attachment features. The air filter assembly includes an attachment bracket integrated into a housing enclosing a filter. The attachment bracket includes a slot mating with a grommet in an attachment apparatus with a screw, nut, and compression limiter. When installed, the attachment apparatus is coupled to the attachment bracket and an engine compartment component (e.g., shotgun rail, frame, engine, Grille Opening Reinforcement, chassis, etc.). The compression limiter prevents the attachment apparatus from exceeding a threshold clamping force on the grommet.

As a result, these two parts work in conjunction to reduce the degradation of the bracket and/or the engine component during assembly installation is reduced. During installation, flanges in the grommet may be slid alongside walls of the attachment bracket towards an end wall. Consequently, the air filter assembly may be efficiently installed without the need for large tooling clearances. Moreover, prior to sliding the attachment apparatus into the bracket, the attachment apparatus may be pre-assembled. As a result, superfluous air filter assembly tooling may be avoided during the installation process, thereby increasing the installation efficiency of the assembly.

Figure 1:
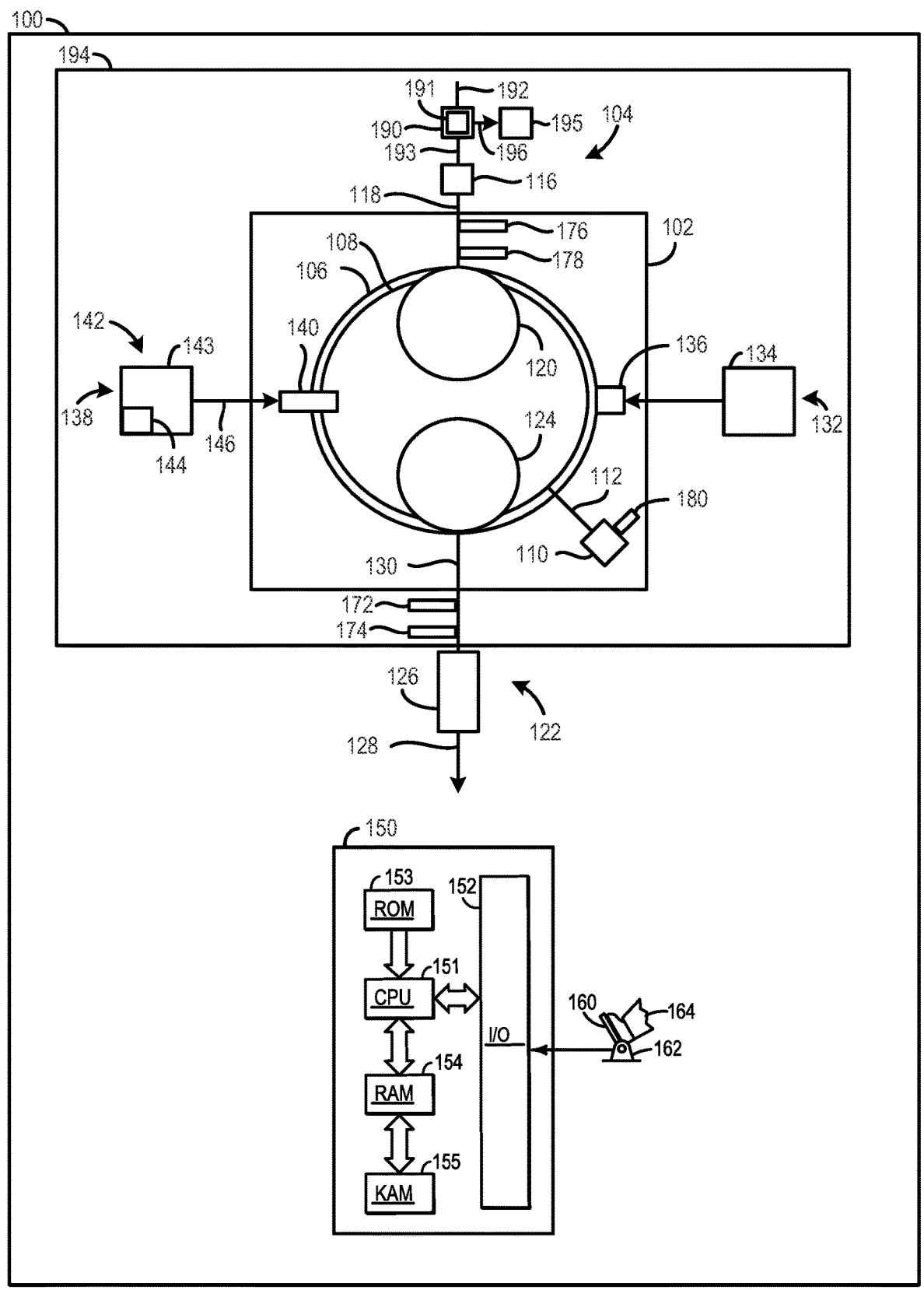
FIG. 1 shows a schematic depiction of a vehicle with an engine having an intake system with an air cleaner assembly.
Figure 2:
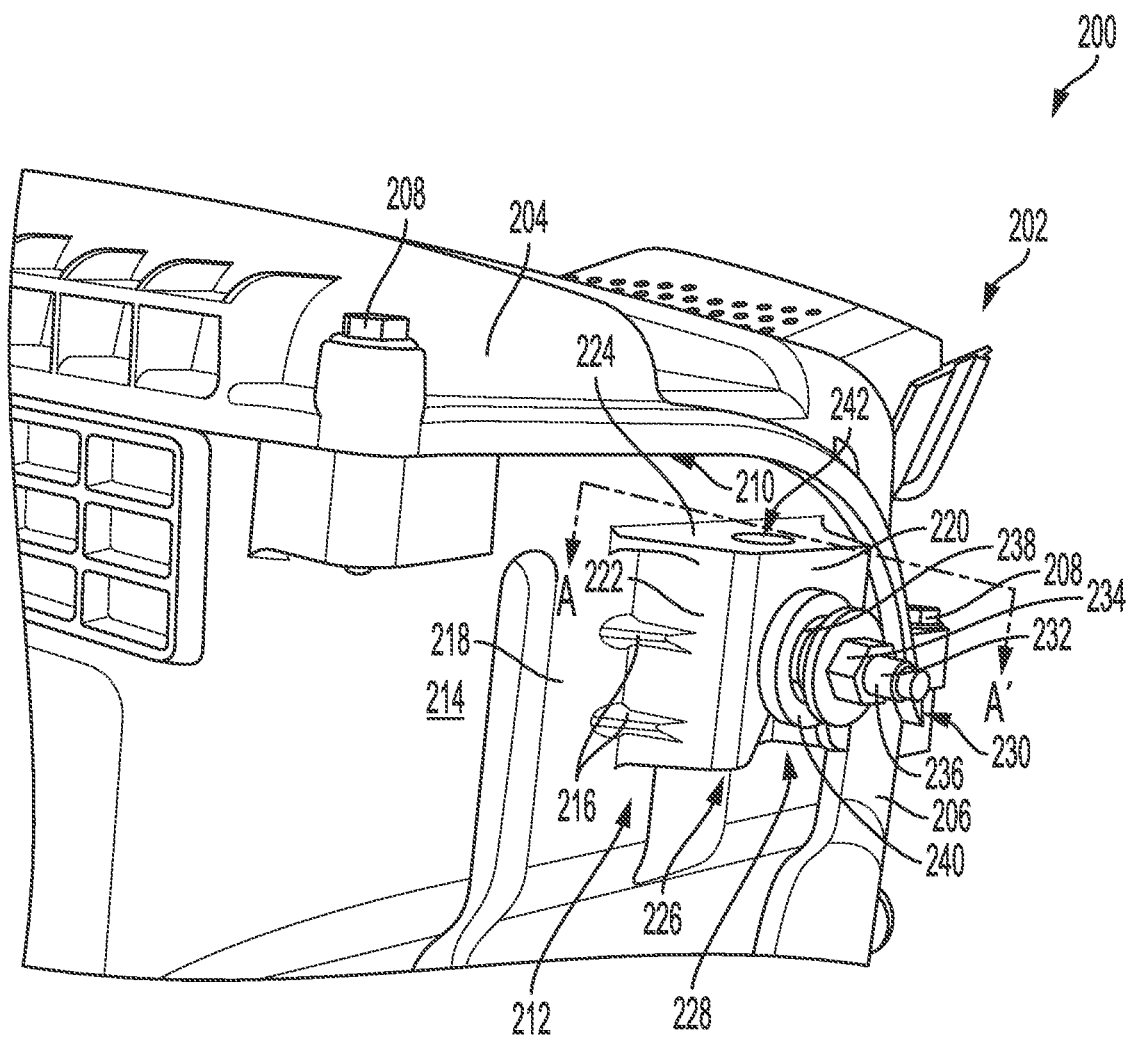
FIG. 2 shows a detailed view of an air cleaner assembly.
Figure 2:
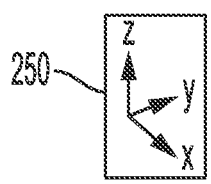
Figure 3:
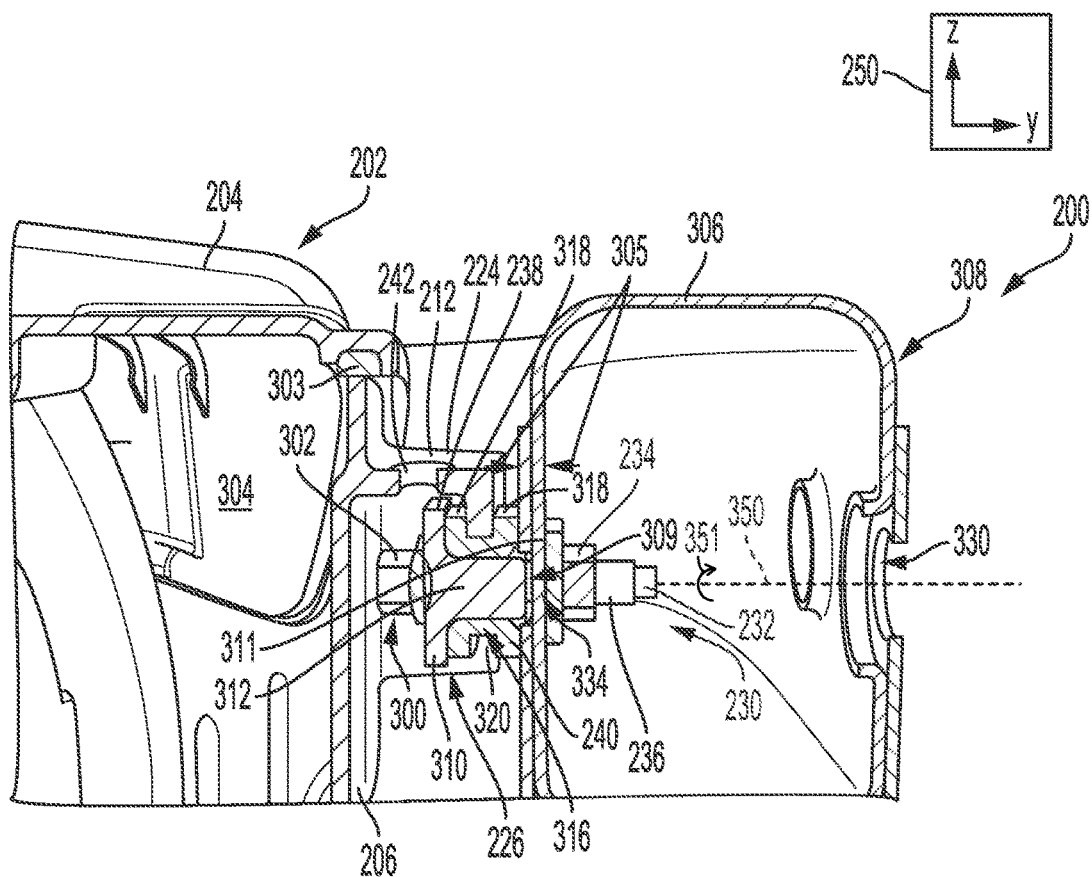
FIG. 3 shows a cross-sectional view of the air cleaner assembly, depicted in FIG. 2.
Figure 4:
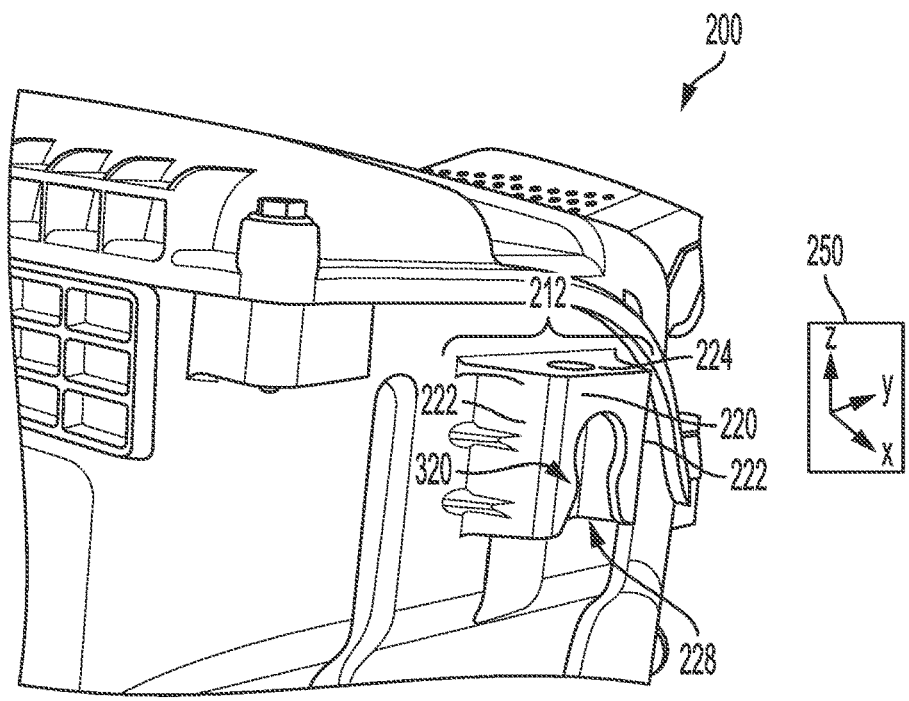
FIGS. 4-6 show different views of an attachment bracket in the air cleaner assembly of FIG. 2.
Figure 5:
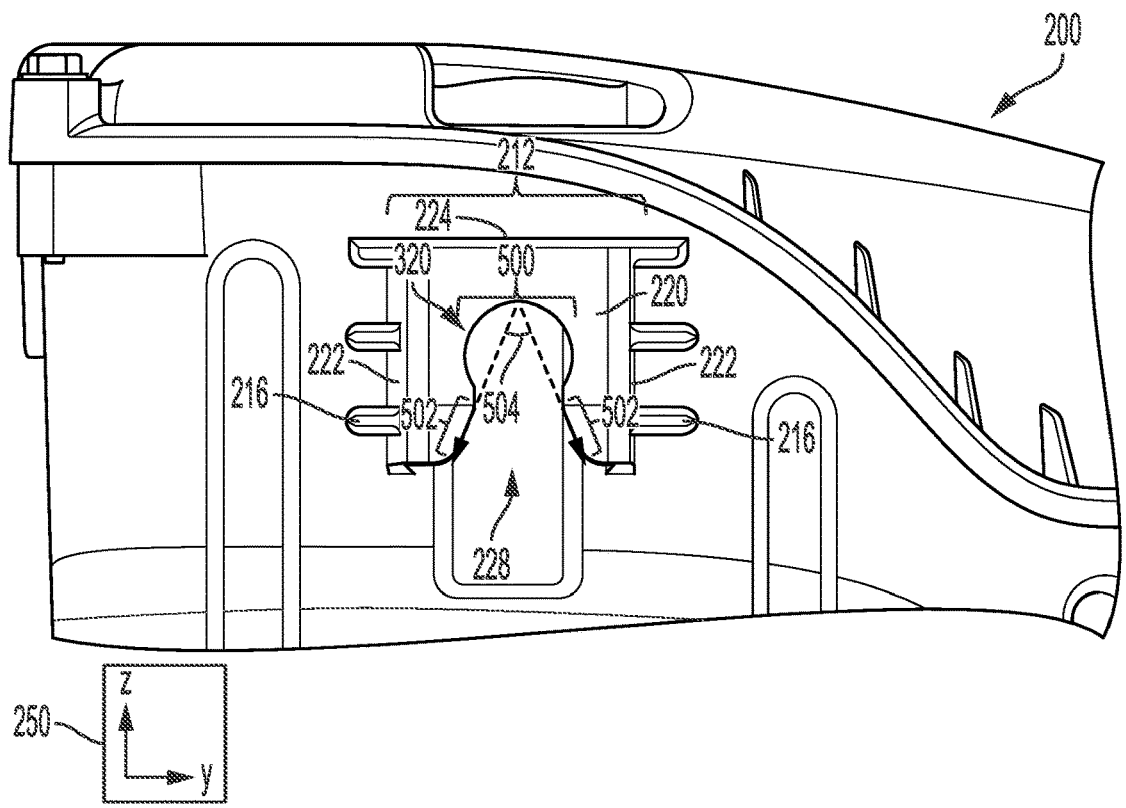
Figure 6:
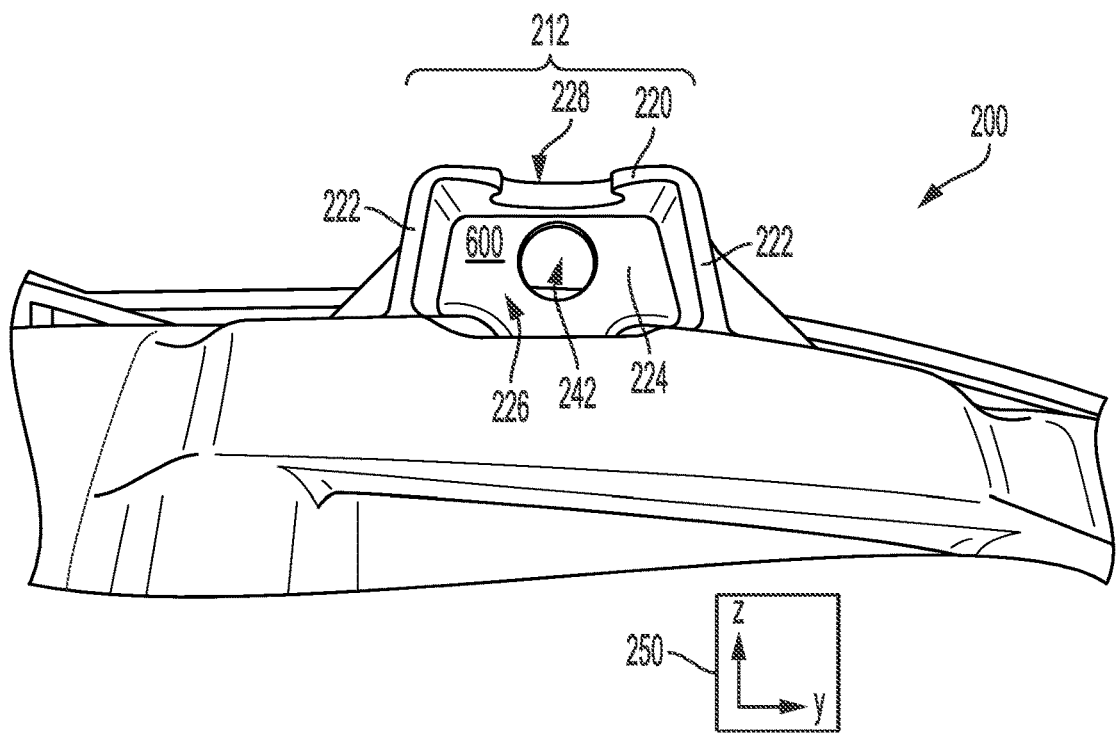

FIG. 1 shows a schematic depiction of an engine including an intake system with an air filter assembly. FIG. 2 depicts a perspective view of an example of an air filter assembly and associated components in an engine compartment. FIG. 3 illustrates a cross-sectional view of the air filter assembly depicted in FIG. 2. FIGS. 4-6 depict different views of an attachment bracket included in the air filter assembly, shown in FIG. 2. FIGS. 7-11 illustrate different examples of an air filter assembly with varying positions of the attachment bracket and the attachment apparatus coupled thereto. FIG. 12 shows an installation procedure for an air filter assembly in an engine compartment.

FIG. 1 is a schematic representation of a vehicle 100 including an internal combustion engine 102. Although FIG. 1 provides a schematic depiction of various engine and engine system components, it will be appreciated that at least some of the components may have different spatial positions and/or greater structural complexity than the components shown in FIG. 1. Specifically, the air filter assembly 190, engine compartment component, 195, and attachment apparatus 196 have greater structural complexity than is depicted in FIG. 1. Examples of the structural features of the air filter assembly and corresponding components are illustrated in FIGS. 2-11 and described in greater detail herein.

An intake system 104 providing intake air to a cylinder 106 (e.g., combustion chamber) is also depicted in FIG. 1. A piston 108 is positioned in the cylinder 106. The piston 108 is coupled to a crankshaft 110 via a connecting rod 112 and/or other suitable mechanical components. It will be appreciated that the crankshaft 110 may be coupled to a transmission that transfers kinetic energy to a drive wheel. Although FIG. 1 depicts the engine 102 with one cylinder, the engine 102 may have additional cylinders, in other examples. For instance, the engine 102 may include a plurality of cylinders that may be positioned in banks.

The intake system 104 includes an air filter assembly 190 including a filter unit 191 enclosed therein. The filter unit 191 is designed to filter unwanted particulates from ambient air, such as dust, pollen, etc. To achieve the filtering functionality the filter unit 191 may include porous material(s) (e.g., paper, foam, cotton, combinations thereof, etc.,) capturing and storing the unwanted particulates. As such, the air filter assembly 190 filters particulates from the air traveling there-through. The air filter assembly 190 is positioned in an engine compartment 194 and is coupled to an engine compartment component 195 via an attachment apparatus indicated via arrow 196. It will be understood that the engine compartment 194 may at least partially enclose the engine 102 and corresponding components.

An inlet conduit 192 provides intake air to the air filter assembly 190. Additionally, an outlet conduit 193 receives filtered air from the air filter assembly 190. The outlet conduit 193 is in fluidic communication with a throttle body 116. The throttle 116 is in fluidic communication with an intake conduit 118 (e.g., intake manifold). The throttle 116 is configured to regulate the amount of airflow provided to the cylinder 106. For instance, the throttle 116 may include a rotatable plate varying the flowrate of intake air passing there-through. In turn, the intake conduit 118 directs air to an intake valve 120. The intake valve 120 opens and closes to allow intake airflow into the cylinder 106 at desired times. The intake valve 120, may include, in one example, a poppet valve with a stem and a valve head seating and sealing on a cylinder port in a closed position.

Further, in other examples, such as in a multi-cylinder engine, additional intake runners may branch off the intake conduit 118 and feed intake air to other intake valves. It will be appreciated that the intake conduit 118 and the intake valve 120 are included in the intake system 104. Moreover, the engine 102, shown in FIG. 1, includes one intake valve and one exhaust valve. However, in other examples, the cylinder 106 may include two or more intake and/or exhaust valves.

An exhaust system 122 configured to manage exhaust gas from the cylinder 106 is also included in the vehicle 100, depicted in FIG. 1. The exhaust system 122 includes an exhaust valve 124 designed to open and close to allow and inhibit exhaust gas flow to downstream components from the cylinder. For instance, the exhaust valve may include a poppet valve with a stem and a valve head seating and sealing on a cylinder port in a closed position.

The exhaust system 122 also includes an emission control device 126 coupled to an exhaust conduit 128 downstream of another exhaust conduit 130 (e.g., exhaust manifold). The emission control device 126 may include filters, catalysts, absorbers, combinations thereof, etc., for reducing tailpipe emissions. The engine 102 also includes an ignition system 132 including an energy storage device 134 designed to provide energy to an ignition device 136 (e.g., spark plug). For instance, the energy storage device 134 may include a battery, capacitor, flywheel, etc. Additionally or alternatively, the engine 102 may perform compression ignition. Therefore, in one example, the ignition system 132 may be omitted from the engine.

FIG. 1 also shows a fuel delivery system 138. The fuel delivery system 138 provides pressurized fuel to a fuel injector 140. In the illustrated example, the fuel injector 140 is a direct fuel injector coupled to cylinder 106. Additionally or alternatively, the fuel delivery system 138 may include a port fuel injector designed to inject fuel upstream of the cylinder 106 into the intake system 104. For instance, the port fuel injector may be an injector with a nozzle spraying fuel into an intake port at desired times. The fuel delivery system 138 includes a fuel tank assembly 142 with a fuel tank 143. The fuel delivery system 138 also includes a fuel pump 144 designed to flow pressurized fuel to downstream components. For instance, the fuel pump 144 may be an electric pump with a piston and an inlet in the fuel tank that draws fuel into the pump and delivers pressurized fuel to downstream components. However, other suitable fuel pump configurations have been contemplated. Furthermore, the fuel pump 144 is shown positioned within the fuel tank 143. Additionally or alternatively the fuel delivery system may include a second fuel pump (e.g., higher pressure fuel pump) positioned external to the fuel tank. A fuel line 146 provides fluidic communication between the fuel pump 144 and the fuel injector 140. The fuel delivery system 138 may include additional components such as a higher-pressure pump, valves (e.g., check valves), return lines, etc., to enable the fuel delivery system to inject fuel at desired pressures and time intervals.

During engine operation, the cylinder 106 typically undergoes a four-stroke cycle including an intake stroke, compression stroke, expansion stroke, and exhaust stroke. During the intake stroke, generally, the exhaust valve closes and intake valve opens. Air is introduced into the combustion chamber via the corresponding intake conduit, and the piston moves to the bottom of the combustion chamber so as to increase the volume within the combustion chamber. The position at which the piston is near the bottom of the combustion chamber and at the end of its stroke (e.g., when the combustion chamber is at its largest volume) is typically referred to by those of skill in the art as bottom dead center (BDC). During the compression stroke, the intake valve and the exhaust valve are closed. The piston moves toward the cylinder head so as to compress the air within the combustion chamber. The point at which the piston is at the end of its stroke and closest to the cylinder head (e.g., when the combustion chamber is at its smallest volume) is typically referred to by those of skill in the art as top dead center (TDC). In a process herein referred to as injection, fuel is introduced into the combustion chamber. In a process herein referred to as ignition, the injected fuel in the combustion chamber is ignited via a spark from an ignition device, resulting in combustion. However, in other examples, compression may be used to ignite the air fuel mixture in the combustion chamber. During the expansion stroke, the expanding gases push the piston back to BDC. A crankshaft converts this piston movement into a rotational torque of the rotary shaft. During the exhaust stroke, in a traditional design, exhaust valve is opened to release the residual combusted air-fuel mixture to the corresponding exhaust passages and the piston returns to TDC.

FIG. 1 also shows a controller 150 in the vehicle 100. Specifically, controller 150 is shown in FIG. 1 as a conventional microcomputer including: microprocessor unit 151, input/output ports 152, read-only memory 153, random access memory 154, keep alive memory 155, and a conventional data bus. Controller 150 is configured to receive various signals from sensors coupled to the engine 102. The sensors may include exhaust gas composition sensor 172, exhaust gas airflow sensor 174, an intake airflow sensor 176, manifold pressure sensor 178, engine speed sensor 180, etc. Additionally, the controller 150 is also configured to receive a pedal position from a pedal position sensor 162 coupled to a pedal 160 actuated by an operator 164.

Additionally, the controller 150 may be configured to trigger one or more actuators and/or send commands to components. For instance, the controller 150 may trigger adjustment of the throttle 116, fuel injector 140, fuel pump 144, etc. Specifically in one example, the controller 150 may send signals to an actuator in the fuel pump 144 to induce fuel pump outflow adjustment. Furthermore, the controller 150 may be configured to send control signals to actuators in the fuel pump 144 and the fuel injector 140 to control the amount and timing of fuel injection provided to the cylinder 106. The controller 150 may also send control signals to the throttle 116 to vary engine speed. The other adjustable components receiving commands from the controller may also function in a similar manner. Therefore, the controller 150 receives signals from the various sensors and employs various actuators to adjust engine operation based on the received signals and instructions stored in memory (e.g., non-transitory memory) of the controller.

FIG. 2 shows an example of an air filter assembly 200. The air filter assembly 200 is an example of the air filter assembly 190, shown in FIG. 1. As such, the air filter assembly 200 shown in FIG. 2 may have similar functionality, features, etc., to the air filter assembly 190, shown in FIG. 1 or vice versa.

An axis system 250 is shown in FIG. 2 as well as FIGS. 3-11 to establish a common frame of reference. In one example, the z-axis may be parallel to a gravitational axis, the x-axis may be a lateral axis and the y-axis may be a longitudinal axis. However, other orientations of the axes may be used, in other examples. Cross-sectional cutting planes indicating the cross-sectional views in subsequent figures are also indicated where appropriate in the figures.

The air filter assembly 200, shown in FIG. 2, includes a housing 202 enclosing a filter unit (not shown). The filter unit may be designed to filter unwanted particulates from ambient air and may include porous material(s) capturing and storing the unwanted particulates, as previously discussed.

The housing 202 includes two sections removably attached to one another. To elaborate, an upper section 204 is removably attached to a lower section 206 to allow the filter unit enclosed within the housing to be accessed and replaced. However, other housing designs have been envisioned, such as a housing that is laterally divided, includes filter trays, etc.

Attachment apparatuses (e.g., bolts) 208 extend through openings in the two sections of the housing to provide removable attachment there between. It will be understood that the two sections (i.e., the upper section 204 and the lower section 206) of the housing may be sealed at their interface 210 to substantially prevent air from traveling there-through into an interior region 304, shown in FIG. 3. The attachment apparatuses 208 may therefore be unthreaded to facilitate detachment of the upper section during, for example, filter replacement.

An attachment bracket 212 included in the air filter assembly 200 is also shown in FIG. 2. The attachment bracket 212 extends away from a lateral side 214 of the housing 202, in the illustrated example. However, in other examples, the attachment bracket 212 may be positioned elsewhere in the housing 202.

Reinforcement ribs 216 extend from the attachment bracket 212 to an outer surface 218 of the housing 202. The attachment bracket 212 includes an outer wall 220, two side walls 222, an end wall 224, and an aperture 226 spaced away from the end wall. A slot 228 receiving an attachment apparatus 230 is included in the outer wall 220. The attachment apparatus 230 includes a screw 232, a nut 234 threading onto a threaded shaft 236 of the screw, a compression limiter 238, and a grommet 240.

The grommet 240 is mated with the slot 228. In this way, the attachment apparatus 230 may be slid into the slot 228 when coupling the air filter assembly 200 to an engine compartment component, such as the component 308 shown in FIG. 3.

The end wall 224 is shown including an opening 242. Cutting plane A-A indicating the cross-sectional view in FIG. 3, is indicated in FIG. 2.

FIG. 3 shows a cross-sectional view of the air filter assembly 200 of FIG. 2 along axis A-A'. The attachment bracket 212 and the attachment apparatus 230 are again shown in FIG. 3.

Screw 232 includes a head 300. The head 300 comprises a plurality of faces 302 forming a polygonal shape facilitating tooling. However, other head contours have been envisioned. For instance, the head may include a recessed section profiled to receive a drive bit. The nut 234 threaded onto the threaded shaft 236 of the screw 232 is also illustrated in FIG. 3. A central axis 350 of the screw 232, is also indicated in FIG. 3. Rotation of the nut 234 in a first rotational direction 351 (e.g., clockwise direction) about the central axis 350 causes the nut to axially translate toward the head 300 of the screw 232. On the other hand, rotation of the nut 234 in a second rotational direction opposing the first rotational direction causes the nut to axially translate away from the head of the screw. It will be understood that in some examples, the nut may be held stationary while the screw is rotated to induce the aforementioned axial translation. The head 300 of the screw 232 may be accessed via the opening 242 in the end wall 224 of the bracket. However, in other examples, the screw head may be accessed via the aperture 226.

The housing 202 include the upper section 204 and the lower section 206. A recess 303 in the upper section 204 may contain a seal, in one example. An interior region 304 of the housing 202 is also shown in FIG. 3. The interior region 304 may be a dirty side of the air filter assembly 200 flowing intake air to a leading side of the filter unit.

The compression limiter 238 is also shown in FIG. 3. The compression limiter 238 is designed to prevent the attachment apparatus from exceeding a threshold clamping force. For example, the attachment apparatus 230 exerts axial clamping forces on the housing 306 of the engine compartment component 308 and the attachment bracket 212 dictated by the axial position of the nut 234 on the threaded shaft 236. The compression limiter 238 prevents further clamping once a distal end 309 contacts the outer surface 311 of the nut 234. The threshold clamping force may be selected based on end-use design goals. For example, the clamping force threshold may be augmented based on a thickness 305 of a housing 306 of the engine compartment component 308, the material construction of the engine compartment component, the material construction of the housing of the air filter assembly 200, etc. For example, the clamping force threshold may be increased when the engine compartment component is constructed out of a metallic material. The engine compartment component 308 is shown including a first opening 330 allowing an interior compartment 332 of the component to be accessed during tooling of the attachment apparatus 230. The component 308 also includes a second opening 334 with the attachment apparatus 230, extending there-through. The engine compartment component 308 may be shotgun rail, frame, engine, Grille Opening Reinforcement, chassis, etc.

The compression limiter 238 includes a flange 310 and a body 312 axially extending from the flange. The flange 310 is shown in radial alignment. However, other flange contours have been envisioned. The flange 310 is axially positioned between the head 300 of the screw and the grommet 240. The body 312 includes an interior opening allowing the threaded shaft 236 of the screw to extend there-through. Additionally, the body 312 is shown positioned in an opening 316 in the grommet 240. The grommet 240 includes a pair of flanges 318. The slot 228 includes a lip 320 axially positioned between the pair of flanges 318.

The attachment bracket 212 and the housing 202 form a continuous shape in the illustrated example. To elaborate, the bracket and the housing form an uninterrupted shape and may be constructed from a common material (e.g., a polymeric material). In this way, the strength of the bracket and housing may be increased while reducing manufacturing costs. For example, the bracket and housing may be constructed using a plastic molding process such as rotomolding, injection molding, blow molding, etc. However, other suitable manufacturing techniques used to form the assembly housing have been contemplated.

FIG. 4 shows a detailed view of the attachment bracket 212 in the air filter assembly 200, with the attachment apparatus 230, shown in FIG. 3, detached. The slot 228, side walls 222, end wall 224, and outer wall 220 in the attachment bracket 212 are again depicted. The lip 320 in the slot 228 in the outer wall 220 is shown. The lip 320 is contoured to interface with the attachment apparatus 230, shown in FIG. 3.

FIG. 5 shows a side view of the attachment bracket 212 in the air filter assembly 200. Again, the slot 228, side walls 222, end wall 224, and outer wall 220 in the attachment bracket 212 are depicted. The lip 320 includes a curved section 500 profiled to mate with the grommet 240 in the attachment apparatus 230, shown in FIG. 3.

The lip 320 also includes two opposing side sections 502. As shown, the opposing side sections 502 of the lip 320 are arranged at an angle 504. In the illustrated example, the angle 504 is a non-straight angle. Specifically, the side sections 502 extend inward toward one another along their lengths. In this way, the lip 320 may guide the attachment apparatus into a desired alignment during installation. The ribs 216 extending from the attachment bracket 212 to the housing 202 are also shown in FIG. 5.

FIG. 6 shows another side view of the attachment bracket 212 in the air filter assembly 200. Again the slot 228, side walls 222, end wall 224, outer wall 220 in the attachment bracket 212 are depicted. The aperture 226 in the bracket allowing the attachment apparatus to be slid into an interior cavity 600 of the attachment bracket 212, is also shown in FIG. 6. The opening 242 in the end wall 224 of the bracket is also illustrated in FIG. 6. The opening 242 may be provided for structural purposes. However, in other examples, the opening 242 may be omitted from the bracket.

Figure 7:
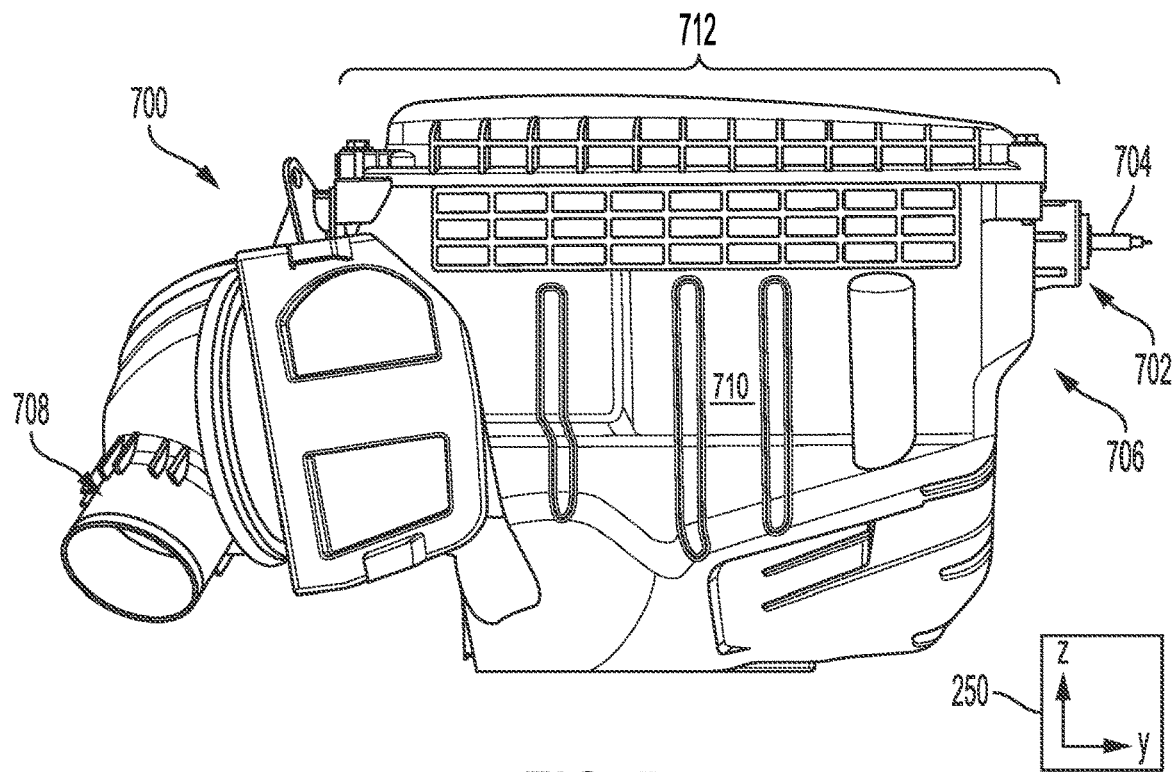
FIGS. 7-11 show example embodiments of an airbox assembly with an attachment bracket and corresponding attachment apparatus positioned in different locations of the airbox housing.

FIG. 7 shows another example of an air filter assembly 700 with an attachment bracket 702 and an attachment apparatus 704. The attachment bracket 702 and the attachment apparatus 704, shown in FIG. 7 as well as the other embodiments shown in FIGS. 8-11 and the attachment bracket 212, shown in FIG. 2, may have at least some common structural and/or functional characteristics. As such, redundant description is omitted for brevity. The attachment bracket 702 and the attachment apparatus 704 are shown positioned on a side 706 of the assembly spaced away from an inlet conduit 708. The location of the bracket may be selected based on packaging and other criteria, for example. Furthermore, the attachment bracket 702 and the attachment apparatus 704 are shown coupled to a lower section 710 of a housing 712. However, numerous locations of the bracket and attachment apparatus have been envisioned.

Figure 8:
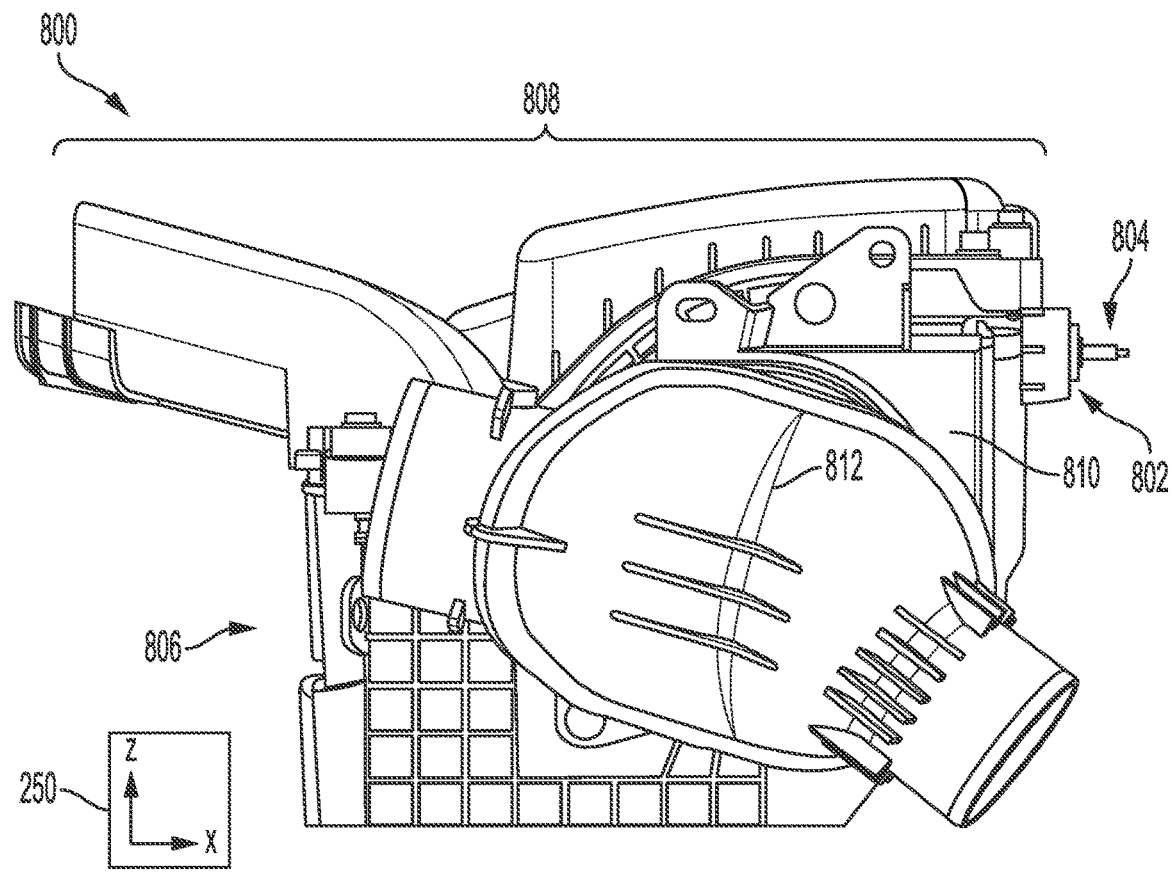

FIG. 8 shows another example embodiment of an air filter assembly 800 having an attachment bracket 802 and attachment apparatus 804 positioned on a lower section 806 of a housing 808 and adjacent to a bracket 810 attached to the inlet conduit 812.

Figure 9:
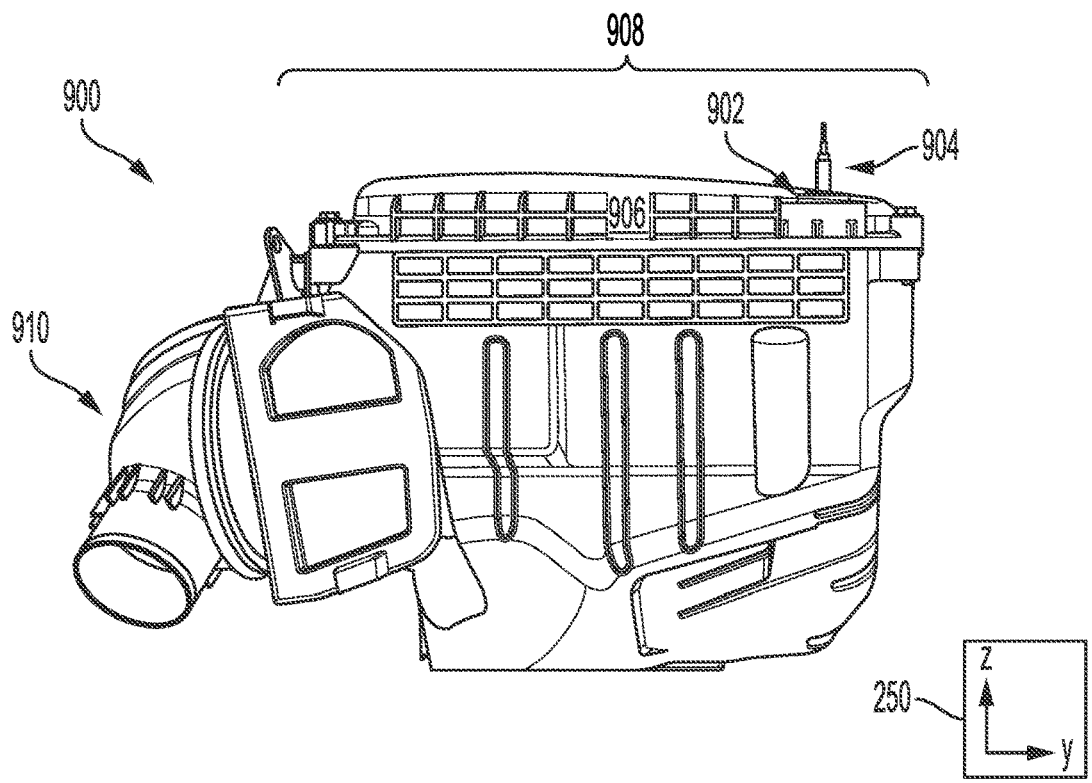

FIG. 9 shows another example embodiment of an air filter assembly 900 having an attachment bracket 902 and attachment apparatus 904 positioned on an upper section 906 of a housing 908 and spaced away from an inlet conduit 910.

Figure 10:
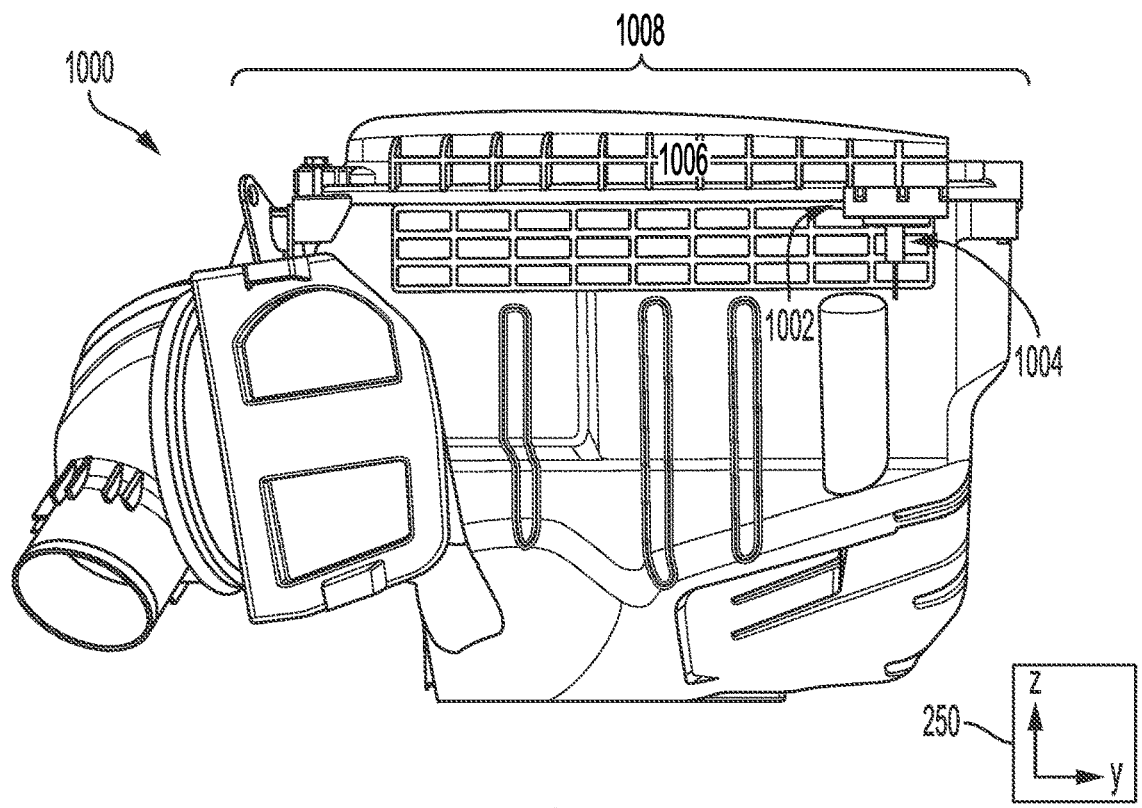

FIG. 10 shows another example embodiment of an air filter assembly 1000 having an attachment bracket 1002 and attachment apparatus 1004 positioned on an upper section 1006 of a housing 1008 with the screw positioned below the attachment bracket 1002.

Figure 11:
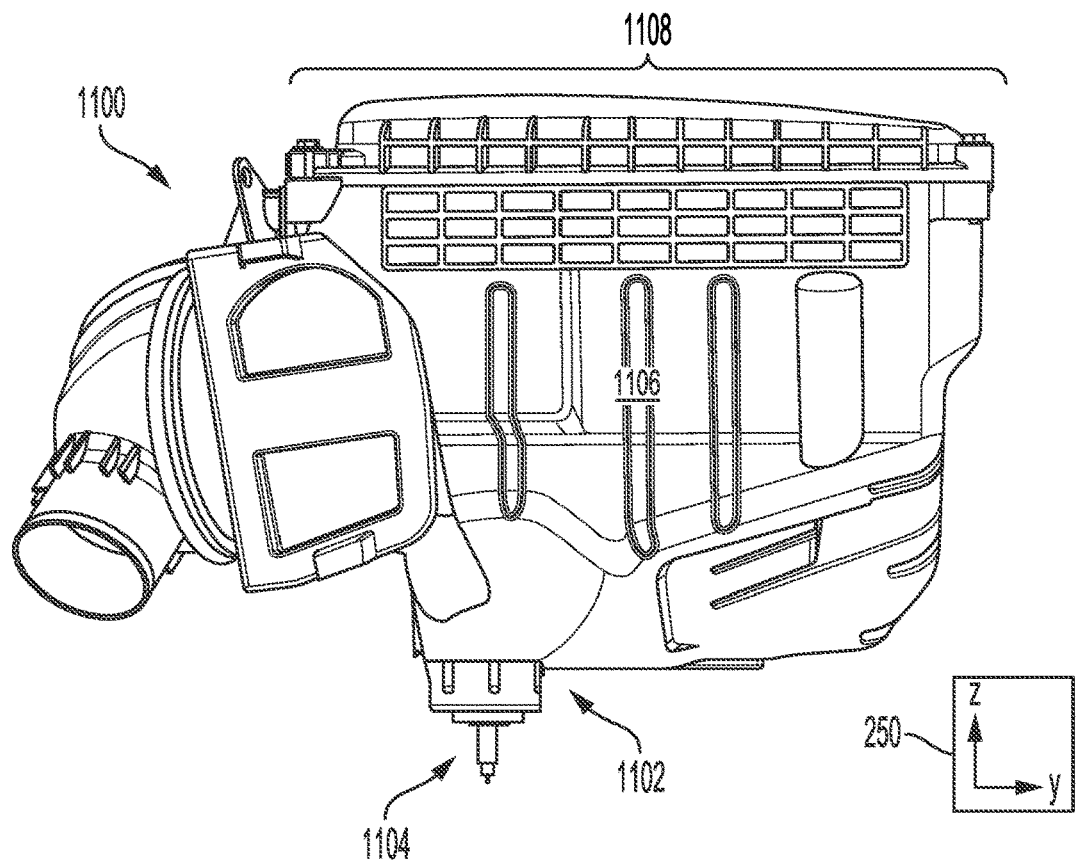
Figure 12:
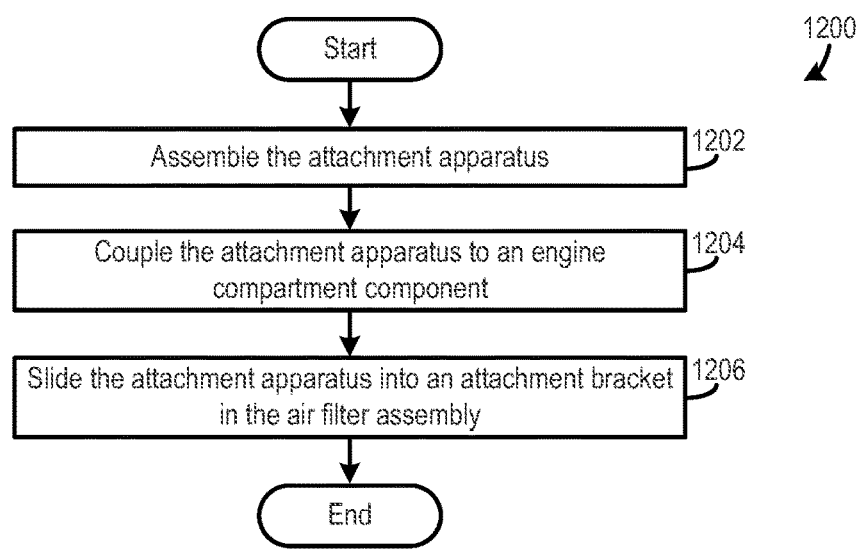
FIG. 12 shows a method for installing an air filter assembly in an engine compartment.

FIG. 11 shows another example embodiment of an air filter assembly 1100 having an attachment bracket 1102 and attachment apparatus 1104 positioned on a bottom surface of a lower section 1106 of a housing 1108 with the screw positioned below the attachment bracket 1102.

FIGS. 2-11 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

It will be appreciated that one or more components referred to as being "substantially similar and/or identical" differ from one another according to manufacturing tolerances (e.g., within 1-5% deviation). Furthermore, as describe herein "approximately" and "substantially" refers to a deviation by 5% or less, unless otherwise noted.

FIG. 12 shows an example method 1200 for installing an air filter assembly in an engine compartment. The method 1200 may be implemented by a controller with instructions stored in non-transitory memory executable by a processor that cause the processor to implement the method steps. Additionally or alternatively, at least a portion of the method steps may be implemented via installation personnel.

At 1202, the method includes assembling the attachment apparatus. For instance, the screw may be mated with the compression limiter and the grommet. Next at 1204, the method includes coupling the attachment apparatus to an engine compartment component. For example, a screw may be inserted through an opening in the engine compartment component and nut may be threaded onto the screw with the compression limiter and grommet axially positioned between the nut and the screw head.

At 1206, the method includes sliding the attachment apparatus into an attachment bracket in the air filter assembly. For example, the grommet in the attachment apparatus may be slid into a slot in the attachment bracket. In this way, the attachment apparatus may be coupled to the air cleaner assembly housing in a tool-free manner. The installation efficiency of the assembly is therefore increased. Method 1200 allows the air filter assembly to be efficiently installed in an engine compartment during vehicle manufacturing. Consequently, the manufacturing cost of the vehicle is reduced.

The technical effect of providing an air filter assembly with a housing enclosing a filter unit, an attachment bracket integrated into the housing and including a slot, and an attachment apparatus clamping the attachment bracket to an engine compartment component, the attachment apparatus comprising a screw including a threaded shaft extending from a head, a grommet mating with the slot, a nut threadingly engaged with the threaded shaft, and a compression limiter positioned between the nut and the head is to increase the installation efficiency of the assembly and reduce the profile of the assemblies attachment structure. Moreover, the air filter assembly with the abovementioned structural characteristics also enables the profile of a filter unit with the housing to be increased due to the space efficient attachment mechanism used to install the assembly in the engine compartment.

The invention will be further described in the following paragraphs. In one aspect, an air filter assembly is provided that comprises: a housing enclosing a filter unit; an attachment bracket integrated into the housing and including a slot; and an attachment apparatus clamping the attachment bracket to an engine compartment component, the attachment apparatus comprising: a screw including a threaded shaft extending from a head; a grommet mating with the slot; a nut threadingly engaged with the threaded shaft; and a compression limiter positioned between the nut and the head.

In another aspect, an air filter assembly in an engine intake system is provided that comprises: a housing enclosing a filter unit; an inlet conduit receiving ambient air and flowing the ambient air to the filter unit; an outlet conduit receiving filtered air and flowing the filtered air to an intake manifold; an attachment bracket integrated into the housing and including an attachment apparatus slot, where the attachment apparatus slot extends through an outer side wall of the attachment bracket and includes a lip; and an attachment apparatus clamping the attachment bracket to an engine compartment component, the attachment apparatus comprising: a screw including a threaded shaft extending from a head; a grommet including a first flange and a second flange mating with the lip of the attachment apparatus slot; a nut threadingly engaged with the threaded shaft; and a compression limiter positioned axially between the nut and the head of the screw.

In any of the aspects or combinations of the aspects, the compression limiter may comprise a flange interposed between the head of the screw and the grommet; and a body extending from the flange through an interior opening in the grommet.

In any of the aspects or combinations of the aspects, the housing and the attachment bracket may form a continuous shape and are constructed out of a common material.

In any of the aspects or combinations of the aspects, the common material may be a polymeric material.

In any of the aspects or combinations of the aspects, the slot may extend through an outer wall of the attachment bracket and may include a lip having a curved section mating with the attachment apparatus.

In any of the aspects or combinations of the aspects, the lip may include two opposing side sections arranged at a non-straight angle with regard to one another.

In any of the aspects or combinations of the aspects, the grommet may include two grommet flanges and where the lip is positioned between the two grommet flanges.

In any of the aspects or combinations of the aspects, the attachment bracket may include opposing side walls, an end wall, and an aperture spaced away from the end wall.

In any of the aspects or combinations of the aspects, where the attachment bracket may include a aperture opposing an end wall.

In any of the aspects or combinations of the aspects, the opposing side walls may further comprise a plurality of reinforcing ribs extending from the opposing side walls to the housing.

In any of the aspects or combinations of the aspects, the compression limiter may be designed to inhibit the attachment apparatus from exceeding a threshold clamping force.

In any of the aspects or combinations of the aspects, the compression limiter may comprise: a flange interposed between the head of the screw and the grommet; and a body extending from the flange through an interior opening in the grommet.

In any of the aspects or combinations of the aspects, the nut may contact the body of the compression limiter when the attachment apparatus reaches a threshold clamping force.

In any of the aspects or combinations of the aspects, the housing and the attachment bracket may form a continuous shape and are constructed out of a common material.

In any of the aspects or combinations of the aspects, where the common material may be a polymeric material.

In any of the aspects or combinations of the aspects, the lip may include two opposing side sections arranged at a non-straight angle with regard to one another.

In any of the aspects or combinations of the aspects, the attachment bracket may include an opening on an end wall.

In any of the aspects or combinations of the aspects, the attachment bracket may include two opposing side walls and an end wall extending from an outer surface of the housing.

In another representation, an air filter assembly in an engine intake system is provided that includes a housing and a slotted bracket formed integrally with the housing and extending outwards from the housing, and an attachment apparatus mating with the slotted bracket and an engine compartment component and generating a clamping force on the slotted bracket and the engine compartment component.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An air filter assembly comprising:
    a housing enclosing a filter unit;
    an attachment bracket integrated into the housing and including a slot that extends downward and opens at a lower side of the attachment bracket; and
    an attachment apparatus clamping the attachment bracket to an engine compartment component, the attachment apparatus comprising:
        a screw including a threaded shaft extending from a head;
        a grommet mating with the slot and the screw;
        a nut threadingly engaged with the threaded shaft; and
        a compression limiter positioned between the nut and the head and mated with the screw.

2. The air filter assembly of claim 1, where the compression limiter comprises:
    a flange interposed between the head of the screw and the grommet; and
    a body extending from the flange through an interior opening in the grommet.

3. The air filter assembly of claim 1, where the housing and the attachment bracket form a continuous shape and are constructed out of a common material.

4. The air filter assembly of claim 3, where the common material is a polymeric material.

5. The air filter assembly of claim 1, where the slot extends through an outer wall of the attachment bracket and includes a lip having a curved section mating with the attachment apparatus.

6. The air filter assembly of claim 5, where the lip includes two opposing side sections arranged at a non-straight angle with regard to one another.

7. The air filter assembly of claim 5, where the grommet includes two grommet flanges and where the lip is positioned between the two grommet flanges.

8. The air filter assembly of claim 1, where the attachment bracket includes opposing side walls, an end wall, and an aperture spaced away from the end wall.

9. The air filter assembly of claim 8, where the attachment bracket includes an aperture positioned opposite to an end wall.

10. The air filter assembly of claim 8, where the opposing side walls further comprise a plurality of reinforcing ribs extending from the opposing side walls to the housing.

11. The air filter assembly of claim 1, where the compression limiter is designed to inhibit the attachment apparatus from exceeding a threshold clamping force.

12. An air filter assembly in an engine intake system, comprising:
    a housing enclosing a filter unit;
    an inlet conduit receiving ambient air and flowing the ambient air to the filter unit;
    an outlet conduit receiving filtered air and flowing the filtered air to an intake manifold;
    an attachment bracket integrated into the housing and including an attachment apparatus slot, where the attachment apparatus slot extends through an outer side wall of the attachment bracket, includes a lip, extends downward, and opens at a lower side of the attachment bracket; and
    an attachment apparatus clamping the attachment bracket to an engine compartment component, the attachment apparatus comprising:

a screw including a threaded shaft extending from a head;

a grommet including a first flange and a second flange mating with the lip of the attachment apparatus slot;

a nut threadingly engaged with the threaded shaft; and a compression limiter positioned axially between the nut and the head of the screw.

13. The air filter assembly of claim 12, where the compression limiter comprises:

a flange interposed between the head of the screw and the grommet; and a body extending from the flange through an interior opening in the grommet.

14. The air filter assembly of claim 13, where the nut contacts the body of the compression limiter when the attachment apparatus reaches a threshold clamping force.

15. The air filter assembly of claim 12, where the housing and the attachment bracket form a continuous shape and are constructed out of a common material.

16. The air filter assembly of claim 15, where the common material is a polymeric material.

17. The air filter assembly of claim 12, where the lip includes two opposing side sections arranged at a non-straight angle with regard to one another.

18. The air filter assembly of claim 12, where the attachment bracket includes an aperture opposing an end wall.

19. The air filter assembly of claim 12, where the attachment bracket includes two opposing side walls and an end wall extending from an outer surface of the housing.

20. The air filter assembly of claim 19, where the opposing side walls further comprise a plurality of reinforcing ribs extending from the opposing side walls to the housing.

\* \* \* \* \*